Figure 1:
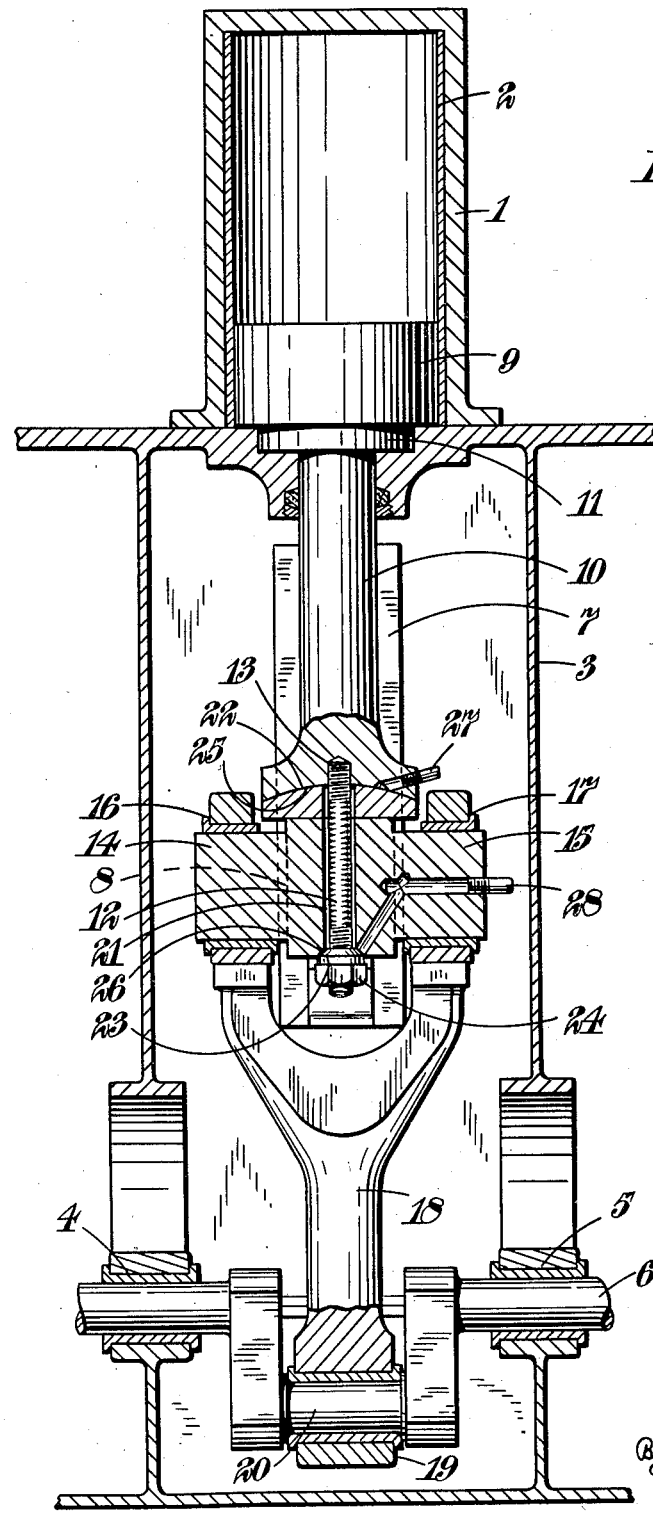

Nov. 6, 1934.    K. O. KELLER    1,979,557
RECIPROCATING CROSSHEAD ENGINE
Filed Oct. 19, 1932    2 Sheets-Sheet 1

INVENTOR
Karl Otto Keller
by his attorneys
Byrnes, Stebbins, Parmelee + Blenko

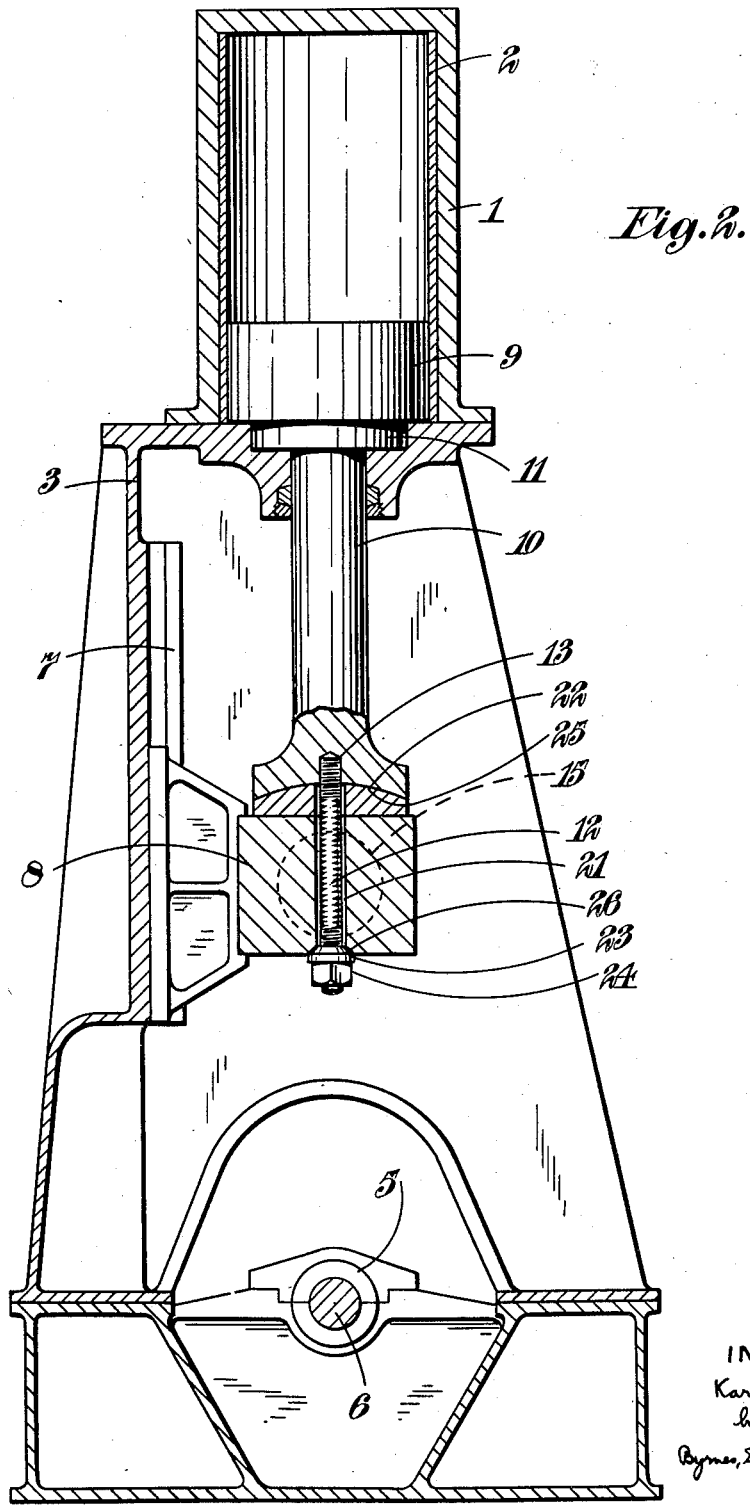

Patented Nov. 6, 1934

1,979,557

UNITED STATES PATENT OFFICE 1,979,557

RECIPROCATING-CROSSHEAD ENGINE

Karl Otto Keller, Sunderland, England, assignor to William Doxford & Sons Limited, Sunderland, England, a British company Application October 19, 1932, Serial No. 638,558
In Great Britain February 19, 1932

4 Claims. (Cl. 287—87)

This invention relates to that kind of engine which is provided with a reciprocating crosshead connected to the crank by a connecting-rod. In such engines it has been the usual practice to secure the piston-rod rigidly to the piston and to a guided crosshead and experience has shown that with the piston its rod and the crosshead thus secured immovably in relation to one another, the working clearances of the crosshead permit lateral rocking movements thereof which so rock the piston in the cylinder-bore as to cause undue wear of the cylinder-liner.

It is the object of the present invention to reduce this wear in reciprocating-crosshead engines whilst retaining the rigid connection between the upper end of the piston-rod and the piston. In what follows a vertical inverted direct-acting engine is referred to by way of example.

The crosshead is connected to the lower end of the piston-rod by an articulation which permits relative rocking movement between the crosshead and the piston in all directions about a single center. This articulation comprises concentric upper and lower spherical bearing surfaces, one convex and the other concave, arranged co-axially with one another and provided near the top and bottom of the crosshead on the end of the piston-rod remote from the piston. Co-operating with these bearing surfaces on the rod are concentric upper and lower spherical bearing surfaces on the crosshead that are counterparts of and make a sliding fit with the spherical bearing surfaces on the piston rod. By this construction lateral rocking movement of the crosshead is prevented from being transmitted to the piston, whereby undue wear of the cylinder liner is prevented.

This articulation thus comprises two co-axial pairs of spherical bearing surfaces and two of the surfaces carried by opposite sides of the crosshead are respectively convex and concave. According to the invention the lower of said pairs of bearing surfaces comprises the concave surface on the crosshead and is of small area as compared with the area of the upper of said pairs of bearing surfaces in order that the spherical movement of the crosshead may be easy and that the movement may be confined to a small area of the lower end of the piston rod. The crosshead thus bears by means of a relatively small concave lower bearing surface against a corresponding convex lower bearing surface on the prolongation of the rod, and presents its larger convex bearing surface towards a corresponding concave bearing surface on the rod.

In the accompanying drawings, I have shown for purposes of illustration only, a preferred embodiment of the invention, in which, Figure 1 is a vertical section through an engine, in which the crosshead is articulated to the lower end of the piston rod in accordance with the present invention; and Figure 2 is a vertical section of the same engine (with connecting rod omitted) taken at right angles to the section in Figure 1.

In the drawings a vertical cylinder 1 containing a liner 2 is carried on the upper end of a frame 3 by which it is connected to bearings 4 and 5 in which is a crank-shaft 6. Fixed on the frame 3 is a guide 7 parallel to the axis of the cylinder 1, and on this guide reciprocates a cross-head 8. The piston 9 is a sliding fit in the cylinder. The piston-rod 10 has its upper end 11 rigidly secured to the piston. Around the lower end of the piston-rod, which is constituted in the example illustrated by a bolt 12 screwed into the piston-rod at 13 and constituting a downward prolongation thereof, is the crosshead 8. The crosshead 8 carries the gudgeon-pins 14 and 15 embraced by the top ends 16 and 17 respectively of the connecting-rod 18. The connecting rod 18 engages at its lower end 19 with the pin 20 of the crank-shaft 6. The crosshead 8 is formed centrally as a conduit of which 21 is the bore. This conduit is of larger internal diameter than the external diameter of the said prolongation 12 to permit small lateral rocking movements of the crosshead to take place without bringing the wall of the bore into collision with the prolongation. The crosshead 8 and the lower part of the piston-rod are connected by an articulation, this articulation being constituted by concentric upper and lower spherical bearing-members 22 and 23 co-axial with one another, the former formed as a concave portion of the lower part of the piston-rod proper and the latter being the spherical top end of a nut 24 screwed on to the bottom end of the prolongation 12, and by concentric upper and lower spherical bearing-members 25, 26 on the crosshead. The part 25 is fixed on the top of the crosshead and is co-axial with the prolongation 12 which passes through it, with a clearance around the prolongation, which clearance is a virtual continuation of the bore of the conduit 21 in the crosshead, and the part 26 is formed by the central portion or the bottom of the crosshead which has a spherical central concavity in it, as shown.

The concentric upper and lower spherical bearing-members 25, 26 on the crosshead are counterparts of and are a sliding fit against the spherical bearing-members 22 and 23 on the rod. By screwing up the nut 24, the piston-rod 10 and the parts 25, 8 and 23 are drawn together, so that there is virtually no slack between them. Pipes 27 and 28 deliver high-pressure lubricant from any convenient source between the coacting spherical surfaces of the parts 22 and 23 and those of the parts 25 and 26.

The crosshead thus bears by means of its lower bearing-member 26 against the lower bearing-member 23 of the rod and presents its upper bearing-member 25 towards the corresponding upper bearing-member 23 of the rod. The bearing-members are segments of a sphere of such size that the bearing pressures between them are of an order normal in top-end bearings.

It is found that with this articulation effecting the junction of the crosshead with the lower end of the piston-rod, and permitting the crosshead to rock freely in relation to the piston-rod even under load, such oscillations of the crosshead are not transmitted to the piston except to a negligible degree and the wear between the cylinder-liner and the piston fixed to the upper end of the piston-rod is therefore greatly reduced, as compared with the wear that results when the crosshead is fixed immovably as is customary to the lower end of the piston-rod.

I claim:—

1. In a reciprocating engine, a connection between a piston-rod subjected to the working load always in one direction and a crosshead, said crosshead having an opening therethrough, and said piston rod having a prolongation of reduced diameter at one end extending through said opening which prolongation is of less diameter than the opening in the cross head and an upper and lower pair of concentric spherical bearing surfaces, whereof the upper pair comprises a concave bearing surface fixed on the piston rod, and a convex bearing surface fixed on the crosshead, and the lower pair comprises a convex bearing fixed on said prolongation and a concave bearing surface in the crosshead, said upper pair of spherical bearing surfaces having a radius of materially greater length than the radius of said lower pair.

2. In a reciprocating engine, a connection between a piston-rod subjected to the working load always in one direction and a crosshead, said crosshead having an opening therethrough, and said piston rod having a prolongation of reduced diameter at one end extending through said opening which prolongation is of less diameter than the opening in the crosshead and a nut which is adjustable along said prolongation and which has a spherical convex bearing surface coacting with the crosshead, and an upper and lower pair of concentric spherical bearing surfaces, whereof the upper pair comprises a concave bearing surface fixed on the piston rod, and a convex bearing surface in the crosshead, and the lower pair comprises said convex bearing surface on said nut, and a concave bearing surface in the crosshead, said upper pair of spherical bearing surfaces having a radius of materially greater length than the radius of said lower pair.

3. In an engine having a piston-rod, and a crosshead, a connection between said piston-rod and crosshead comprising a convex spherical bearing surface on the crosshead, a concave spherical bearing surface on the piston-rod cooperating therewith, a concave spherical bearing surface on the opposite side of the crosshead, a member having a convex spherical bearing surface cooperating therewith and secured to the piston-rod, said second pair of cooperating bearing surfaces being concentric with said first pair and having a materially shorter radius.

4. In an engine having a piston-rod, a crosshead, and a connecting rod, in which the connecting rod has a yoke embracing and pivotally connected to the crosshead, a connection between said piston-rod and crosshead, comprising a convex spherical bearing surface on the crosshead, a concave spherical bearing surface on the piston-rod cooperating therewith, a concave spherical bearing in the opposite side of the crosshead, a lower member having a convex spherical bearing surface cooperating therewith and secured to the piston-rod, said second pair of cooperating bearing surfaces being concentric with said first pair and having a materially shorter radius, said lower member lying between the arms of the yoke.

KARL OTTO KELLER.